4 Sheets—Sheet 1.

W. O. HICKOK, A. COOPER & G. W. BROWN.
Paper-Ruling Machine.

No. 223,912.      Patented Jan. 27, 1880.

W. O. HICKOK, A. COOPER & G. W. BROWN.
Paper-Ruling Machine.

No. 223,912. Patented Jan. 27, 1880.

4 Sheets—Sheet 3.

W. O. HICKOK, A. COOPER & G. W. BROWN.
Paper-Ruling Machine.

No. 223,912. Patented Jan. 27, 1880.

4 Sheets—Sheet 4.
W. O. HICKOK, A. COOPER & G. W. BROWN.
Paper-Ruling Machine.
No. 223,912. Patented Jan. 27, 1880.
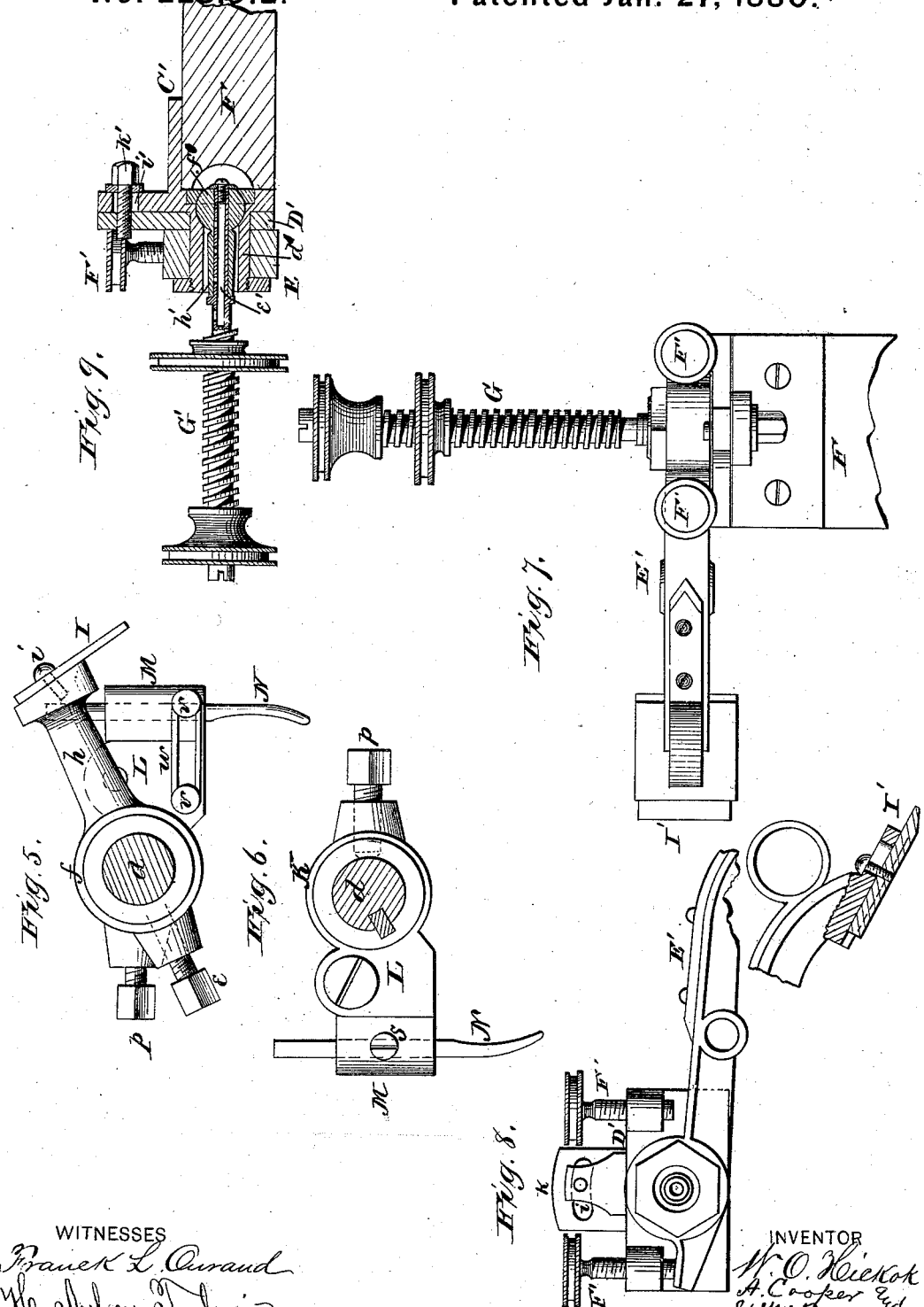
WITNESSES
INVENTOR
ATTORNEYS

UNITED STATES PATENT OFFICE.

WILLIAM O. HICKOK, ALBERT COOPER, AND GEORGE W. BROWN, OF HARRISBURG, PENNSYLVANIA; SAID COOPER AND BROWN ASSIGNORS TO SAID HICKOK.

PAPER-RULING MACHINE.

SPECIFICATION forming part of Letters Patent No. 223,912, dated January 27, 1880.

Application filed June 7, 1879.

*To all whom it may concern:*

Be it known that we, WILLIAM O. HICKOK, ALBERT COOPER, and GEORGE W. BROWN, of Harrisburg, in the county of Dauphin, and in the State of Pennsylvania, have invented certain new and useful Improvements in Paper-Ruling Machines; and we do hereby declare that the following is a full, clear, and exact description thereof, reference being had to the accompanying drawings, and to the letters of reference marked thereon, making a part of this specification.

Our invention relates to improvements in paper-ruling machines; and it consists in the construction and arrangement of the mechanism for throwing the machine in and out of gear, the mechanism for operating the gate, the construction of the gate, the device for adjusting the delivery-table, and in the construction of the striker, all as will be hereinafter more fully set forth.

In order to enable others skilled in the art to which our invention appertains to make and use the same, we will now proceed to describe its construction and operation, referring to the annexed drawings, in which—

Figure 1:
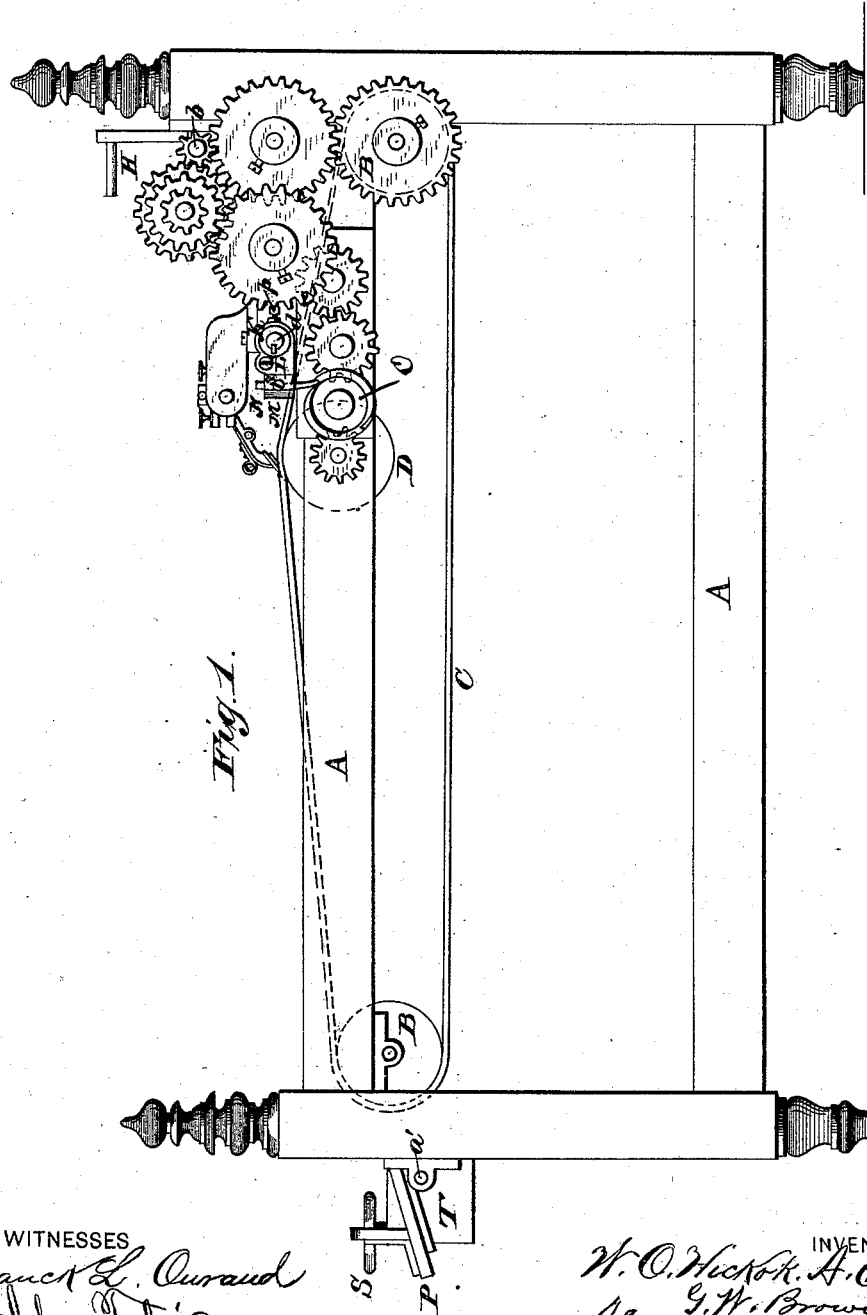
Figure 2:
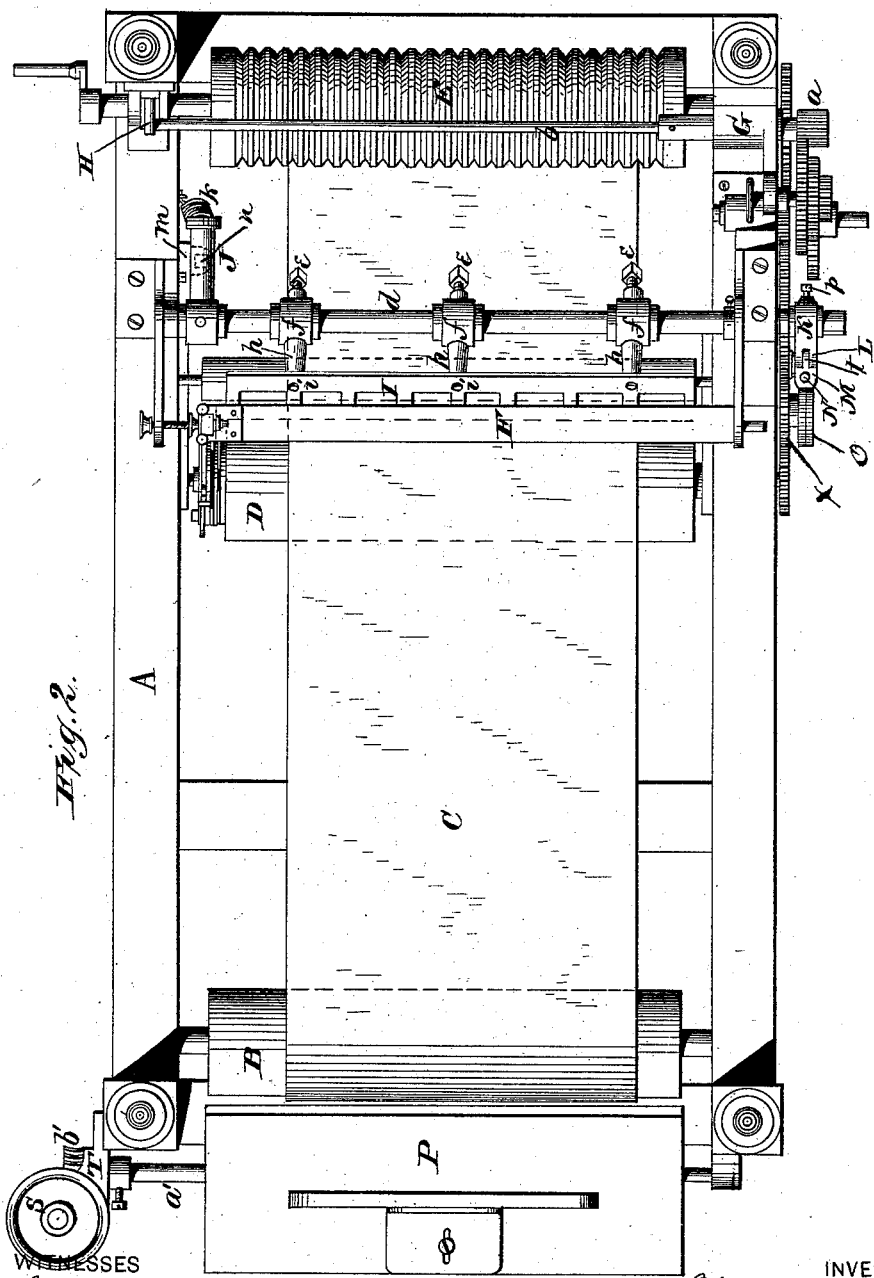
Figure 3:
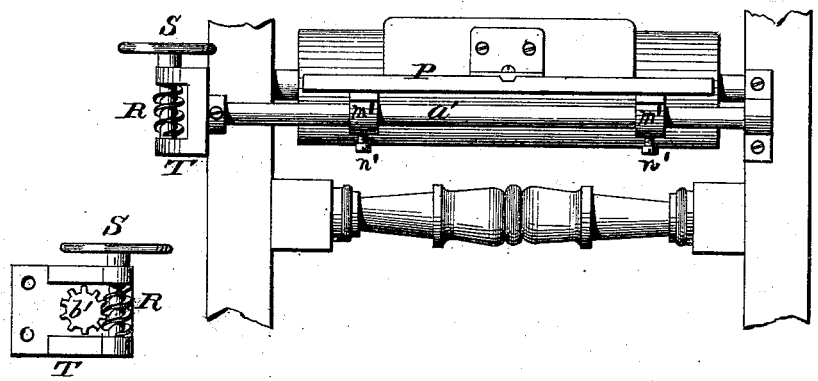
Figure 4:
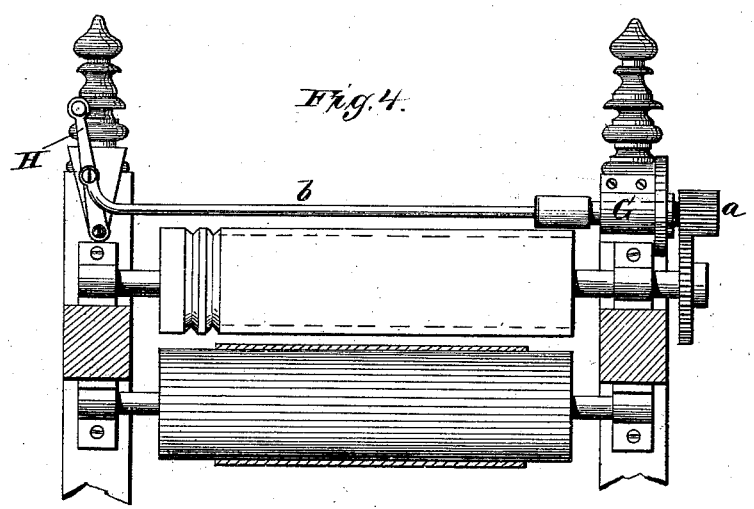

Figure 1 is a side elevation of a paper-ruling machine embodying our invention. Fig. 2 is a plan view of the same. Fig. 3 is an end view of the machine, showing the delivery-table and mechanism for adjusting the same. Fig. 4 is a cross-section, showing the mechanism for throwing the machine in and out of gear. Figs. 5 and 6 are detailed views of the gate and device for operating the same. Figs. 7, 8, and 9 are detailed views of the end of the pen-beam and striker attached thereto.

A represents the frame-work of a paper-ruling machine. B B are the rollers around which the endless apron C passes. D is the pen-cylinder. E is the feed-roller, and F is the pen-beam, all of said parts being constructed in any of the known and usual ways.

In Fig. 1 we have shown the system of gearing for operating the various parts, which, however, is not necessary to describe in detail.

At a suitable point in this system of gearing is a pinion, $a$, through which motion is communicated from the feed-roller to the striker, but so arranged that independent of said pinion the other parts of the machine will be operated—that is to say, even if said pinion $a$ should be removed, and thus stop the motion of the striker, the remaining parts of the machine would still continue in operation. This pinion $a$ is placed on the end of a shaft, $b$, which passes through an elongated bearing, G, attached to the inside of one of the corner-posts, the said shaft extending across the machine and having its end pivoted to a lever, H. This lever is pivoted at its lower end to a bracket fastened on the other corner-post.

By the use of the lever H the shaft $b$ may be moved outward longitudinally, so as to disengage the pinion $a$ from the two cog-wheels with which it was in mesh, thus stopping the shaft and cam-wheel which operate the striker, while the feed-roller and endless apron continue their movement. The shaft $b$ is easily moved inward again to cause the pinion $a$ to engage with the cog-wheels and start the striker.

This device is entirely separate and independent from the device for stopping the entire machine.

It is often desirable, in ruling paper, that a change should be quickly made from ruling short lines to long or continuous ones, and vice versa.

By the device as above described the operator can instantaneously stop or start the device which operates the striker without interfering with the movement of the other parts of the machine in any way.

The gate of our improved paper-ruling machine is constructed in the following manner: $d$ is a shaft placed in suitable bearings, and provided with a series of collars, $f f$, which are fastened by set-screws $e e$, and from each collar projects a post or arm, $h$, of suitable length. To the outer ends of these posts or arms are, by screws $i$, attached the notched bar or gate I, running parallel with the shaft $d$. Ordinarily the gate is attached directly in the shaft, in a groove therein; but by our invention the gate is thrown forward a certain distance beyond the shaft.

The advantage of this construction is, that it requires a considerably less movement of the shaft to raise and lower the gate. Further, the posts or arms h are adjustable axially on the shaft d, which is of great importance in the proper adjustment of the gate.

Near one end of the shaft d is secured an arm, J, which extends rearward, and is pulled down by a spiral spring, k, for raising the gate. The arm J is, on its under side, provided with a lug, n, to come down on a rubber-covered stop, m, secured to the side of the frame. On the other end of the shaft d is feathered a collar, K, which may be adjusted out or in, and fastened by a set-screw, p.

On the front of the collar K is a vertically-slotted projection, L, in which is pivoted a tenon or tongue, t, formed with or on a socket, M, and through this socket is passed a vertical finger, N, fastened by means of a set-screw, s.

On the sides of the projection L and socket M are two projecting pins, v v, connected by a rubber band or spring, w. The finger N works against the periphery of a cam-wheel, O, mounted upon a stud on the side of the frame, said cam-wheel being on its hub provided with a pinion, x, which forms a part of the system of gearing referred to, so that the cam-wheel will have a continuous rotary motion when the machine is in operation. During each revolution of the cam-wheel the finger N is depressed for a certain length of time, which lowers the gate onto the apron, so as to straighten the paper as it passes into the machine and before it reaches the pens. As soon as the cam passes from under the finger N the spring k throws the gate up again.

If the machine should be run backward at any time, the joint formed by the projection L and socket M will break, and the socket and its finger N turn out of the way, while the spring w will return the same to its proper position as soon as the machine is run forward again.

P is the delivery-table, secured upon a shaft, a', placed in suitable bearings at the end of the main frame. At one end of this shaft is secured a pinion, b', which engages with a vertical worm-screw, R, placed in a suitable bearing, T, and provided at its upper end with a hand-wheel, S. By turning the hand-wheel S the table P can easily be adjusted at any angle desired to allow the paper to drop, as required.

The delivery-table P is attached to the shaft a' by means of hubs m', fastened by set-screws n', so that the table can be adjusted on the shaft both laterally and axially, as required.

On the end of the pen-beam F is secured an angular plate or casting, C', formed with an outwardly-projecting hollow boss or hub, d', on which are placed a plate, D', and the striker E'.

In the inner end of the hub d' is formed a seat or socket to receive the ball f'', in which is fastened the tubular projection e' of the screw G', the said ball being formed with a sleeve, h', surrounding a portion of the tube e'.

Ordinarily the pen-rest is located above or below the center of the pen-beam. This pen-rest is made in the center of the beam, and by the ball-joint the parts can be adjusted or changed in the machine so as not to bind.

The plate D' is adjusted with relation to the casting C' by means of a slot, i', and screw k', and on said plate are projections, through which the set-screws F' are passed. If these screws are not enough to adjust with, or do not go far enough up or down, the plate D' may be changed and the adjustment then completed, because the plate D' turns on the projecting hub d' at the end of the pen-beam, and after this plate is adjusted and fastened in place, then the set-screws F', which pass through nuts on said plate, may be adjusted to regulate the movement of the striker and pen-beam.

The end of the striker E' is provided with a steel plate, I', having its outer edge beveled, and which is adjustable out and in, so as to suit the drop of the cams that operate the pen-bar.

According to different kinds of ruling, or different kinds of pens used, the pen-beam is raised or lowered, as required, and when so adjusted the steel plate I' has to be adjusted to correspond, so as to cause the cams to act thereon properly. Without this adjustable plate the striker would stand at different angles, according to the different adjustments of the pen-beam; but by the use of said plate the striker is lengthened or shortened, as required, to bring it in proper position and at proper angle with relation to the cams.

Having thus fully described our invention, what we claim as new, and desire to secure by Letters Patent, is—

1. In a pen ruling-machine, the combination, with the system of gearing, substantially as shown, for operating the various parts thereof, of the longitudinally-movable shaft b, with pinion a, and the lever H, the pinion being interposed at such a point in the system of gearing that the devices for operating the striker may be stopped and started instantaneously without interfering with the movements of the other parts of the machine, substantially as and for the purposes herein set forth.

2. The combination of the shaft d, axially and laterally adjustable collars f, with set-screws e, and the posts or arms h, and the continuous gate I, attached to the ends of said posts, substantially as herein set forth.

3. In a device for operating the gate in a paper-ruling machine, a jointed arm or projection on the gate-shaft, provided with a finger operating on a rotating cam-wheel for lowering the gate, in combination with a spring for raising the gate, substantially as herein set forth.

4. The combination of the collar K with slotted projection L, the socket M, with tenon or tongue $t$, and the adjustable finger N, substantially as and for the purposes herein set forth.

5. The combination of the delivery-table P, laterally and axially adjustable upon the shaft $a'$ by means of the hubs $m'$ and set-screws $n'$, the shaft $a'$, pinion $b'$, and worm-screw R, substantially as and for the purposes herein set forth.

6. In combination with the pen-beam of a ruling-machine, the casting C', fitting on the end thereof, and provided with the hollow hub $d'$, the adjustable plate D', with set-screws F', and the striker E', substantially as and for the purposes herein set forth.

7. The screw G', with tubular projection $e'$ and the ball $f'$, in combination with the pen-beam and casting C', substantially as herein set forth.

8. In a paper-ruling machine, the combination of the pen-beam, the striker, and an adjustable steel plate, I', for lengthening and shortening the striker, substantially as and for the purposes herein set forth.

In testimony that we claim the foregoing we have hereunto set our hands this 13th day of May, 1879.

WILLIAM O. HICKOK.
  ALBERT COOPER.
  GEO. W. BROWN.

Witnesses:
 D. C. MAUREN,
 S. SCHRIVER.